(12) United States Patent
Glaub et al.

(10) Patent No.: US 8,610,601 B2
(45) Date of Patent: Dec. 17, 2013

(54) KITCHEN HOOD ASSEMBLY WITH FIRE SUPPRESSION CONTROL SYSTEM AND BUILT-IN REDUNDANCY

(75) Inventors: William E. Glaub, Raleigh, NC (US); William Brian Griffin, Columbia, PA (US)

(73) Assignee: Captive-Aire Systems, Inc., Raleigh, NC (US)

( * ) Notice: Subject to any disclaimer, the term of this patent is extended or adjusted under 35 U.S.C. 154(b) by 0 days.

(21) Appl. No.: 13/616,301

(22) Filed: Sep. 14, 2012

(65) Prior Publication Data

US 2013/0048319 A1  Feb. 28, 2013

Related U.S. Application Data

(60) Division of application No. 12/632,063, filed on Dec. 7, 2009, now Pat. No. 8,378,834, which is a continuation of application No. 12/114,382, filed on May 2, 2008, now Pat. No. 7,963,282.

(51) Int. Cl.
*G08B 21/00* (2006.01)

(52) U.S. Cl.
USPC .............. 340/999; 340/540; 340/635; 169/56

(58) Field of Classification Search
USPC ......... 340/506, 540, 584, 654, 660–664, 999; 169/56–65
See application file for complete search history.

(56) References Cited

U.S. PATENT DOCUMENTS

| 4,363,642 A | 12/1982 | Stahl |
| 5,642,784 A | 7/1997 | Guay et al. |
| 6,162,286 A | 12/2000 | Hasama et al. |
| 2002/0028501 A1 | 3/2002 | McMinn, Jr. |

FOREIGN PATENT DOCUMENTS

WO 2008035064 3/2008

*Primary Examiner* — Jeffery Hofsass
(74) *Attorney, Agent, or Firm* — Coats and Bennett PLLC

(57) ABSTRACT

A kitchen exhaust hood assembly having a fire suppression system with built-in redundancy and monitoring capabilities is presented. The fire suppression system includes one or more fire suppression devices associated with the kitchen hood for extinguishing a fire within the vicinity of the exhaust hood. The fire suppression devices can be triggered by a series of manual actuators or fire sensors. A switching circuit including a plurality of switches operatively connected to the manual actuators or fire sensors triggers the fire suppression devices by enabling either a first or second actuating circuit.

14 Claims, 10 Drawing Sheets

KITCHEN HOOD ASSEMBLY WITH FIRE SUPPRESSION CONTROL SYSTEM AND BUILT-IN REDUNDANCY

RELATED APPLICATION

The present application is a Divisional of U.S. application Ser. No. 12/632,063 filed Dec. 7, 2009, which is a Continuation-in-Part of U.S. application Ser. No. 12/114,382 filed on May 2, 2008, which are herein incorporated by reference in entirety.

BACKGROUND

Commercial kitchens are equipped to prepare food for large numbers of people in facilities such as restaurants, hospitals and the like. Such kitchens are typically equipped with one or more commercial duty cooking units capable of cooking large amounts of food. On such a scale, the cooking process may generate substantial amounts of cooking heat and airborne cooking by-products such as water vapor, grease particulates, smoke and aerosols, all of which must be exhausted from the kitchen so as not to foul the environment of the facility. Too this end, large exhaust hoods are usually provided over the cooking units, with duct work connecting the hood to a motor driven exhaust fan located outside the facility such as on the roof or on the outside of an external wall. As the fan is rotated by the motor, air within the kitchen environment is drawn into the hood and exhausted to the outside atmosphere. In this way, heat and cooking by-products generated by the cooking units follow an air flow path to the outside through the hood.

Since part of the cooking by-products is formed by minute particles of grease that have a tendency to stick to the plenum chamber of the exhaust hood, many exhaust hoods include a system to wash the plenum chamber and the exhaust duct periodically. These washing systems typically include a valve assembly provided between a water source and one or more outlet nozzles mounted in the plenum chamber. A timer is often used to create a wash cycle by opening the valve assembly for a predetermined time.

To conform to safety regulations, conventional exhaust hoods additionally include a fire detection system and a fire suppression mechanism associated with the kitchen exhaust hood designed to extinguish a fire within the vicinity of the exhaust hood. The fire detection system may include one or more fusible links, heat sensors, manual switches or any other form of fire detectors. Typically, the kitchen exhaust hoods include a fire suppression system that employs the washing systems used to clean them. However, some systems include more advanced fire suppression techniques. Typically fire detection system signals an electrically operated valve, such as a solenoid valve, to provide fire suppressant through a nozzle to the interior of the plenum chamber to extinguish the fire.

Once installed, the kitchen exhaust hoods and fire suppression systems are typically not altered, but are kept serviceable through routine maintenance. Unfortunately, routine maintenance can cause fire suppression devices to be removed from the system and not replaced properly. For example, routine maintenance could require the removal of a pressurized gas tank for testing. A failure to properly replace the gas tank after the maintenance can cause the fire suppression system to not operate as effectively. Additionally, the electrical wiring of the kitchen hood and fire suppression system has the potential of being unintentionally damaged. For example, the kitchen hood and fire suppression system could be unintentionally damaged during kitchen renovations, where a break in the signaling line between the fire detection system and the fire suppression system could result in the fire suppression system not reacting to the detection of a fire. Thus, there is a need to monitor the electrical connectivity and integrity of the kitchen hood and fire suppression systems and provide a means for providing a built-in redundant fire suppression system.

SUMMARY

In one illustrative embodiment, the present invention is embodied in a kitchen exhaust hood assembly having a fire suppression system with built-in redundancy. The fire suppression system includes one or more fire suppression devices associated with the kitchen hood for extinguishing a fire within the vicinity of the exhaust hood. The fire suppression devices can be triggered by a series of manual actuators or fire sensors. A switching circuit including first and second parallel conductors and a series of parallel switches connected between the conductors are operatively connected to the series of manual actuators or fire sensors. Triggering of the fire suppression devices is enabled by either a first or second actuating circuit. The first actuating circuit is operatively interconnected between the first conductor of the switching circuit and the fire suppression devices. The second actuating circuit is operatively interconnected between the first conductor of the switching circuit and the fire suppression devices. The switching circuit and first and second actuating circuits are configured such that a break in the first conductor enables each of the switches to actuate either the first or second actuating circuits.

In another embodiment, the present invention includes a kitchen exhaust hood assembly having a fire suppression system and a supervision module for monitoring the elements of the fire suppression system. The fire suppression system includes one or more fire suppression devices associated with the kitchen hood for extinguishing a fire within the vicinity of the exhaust hood. The fire suppression devices can be triggered by a series of manual actuators or fire sensors. A switching circuit including first and second parallel conductors and a series of parallel switches connected between the conductors are operatively connected to the series of manual actuators or fire sensors. The supervision module includes a plurality of monitoring circuits selected from a group including:

a first monitoring circuit for monitoring the integrity of a first conductor of the switching circuit employed to actuate the fire suppression devices;

a second monitoring circuit for monitoring the integrity of a second conductor of the switching circuit employed to actuate the fire suppression devices;

a third monitoring circuit for sensing the presence of a gas cylinder associated with a chemical fire suppression device;

a fourth monitoring circuit for determining whether a solenoid associated with the chemical fire suppression device is electrically connected to a voltage supply;

a fifth monitoring circuit for determining whether a solenoid associated with a water based fire suppression device is electrically connected to a voltage supply;

a sixth monitoring circuit for monitoring the liquid level within a surfactant tank that is mixed with water suppress a fire; and a seventh monitoring circuit for determining whether a pump associated with the surfactant tank is electrically connected to a voltage supply.

Other objects and advantages of the present invention will become apparent and obvious from a study of the following description and the accompanying drawings which are merely illustrative of such invention

DESCRIPTION OF THE INVENTION

Figure 1:
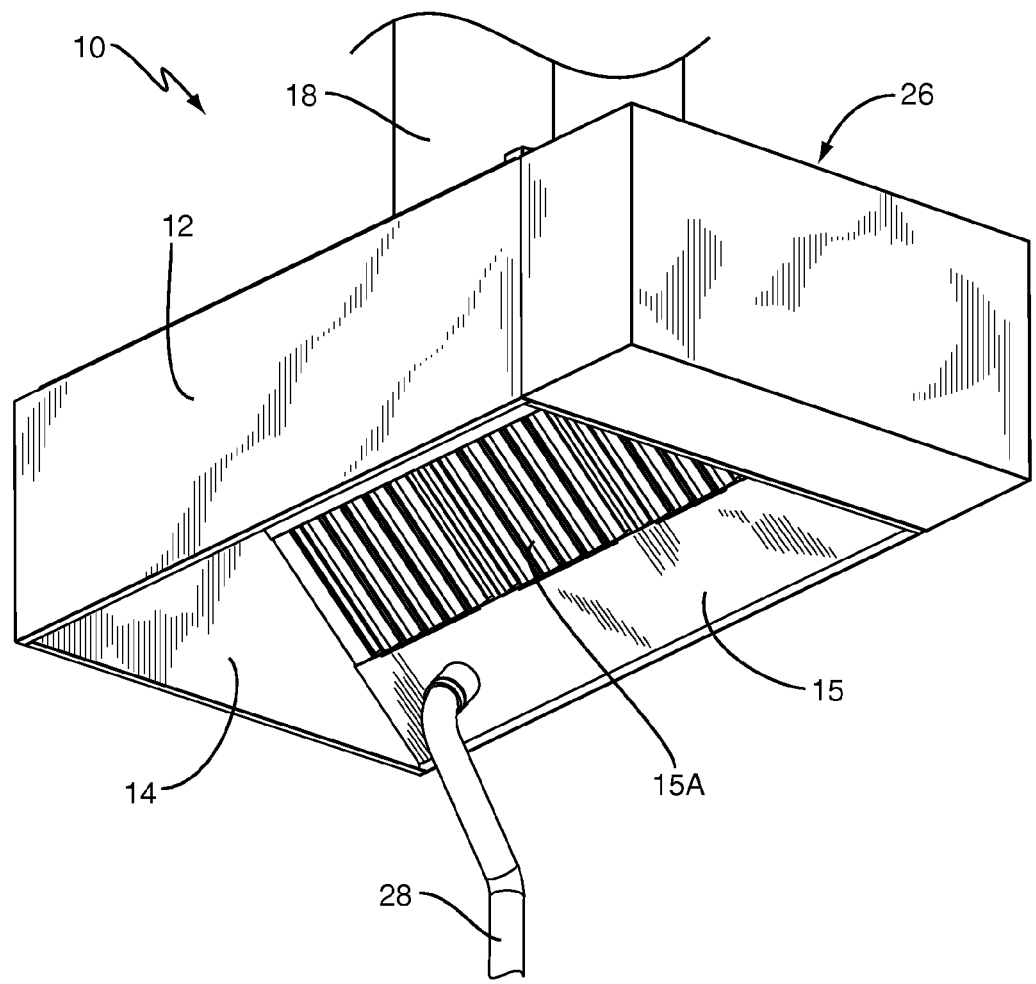
FIG. 1 is a perspective view of the kitchen hood assembly with the combination cleaning and fire suppression system.
Figure 2:
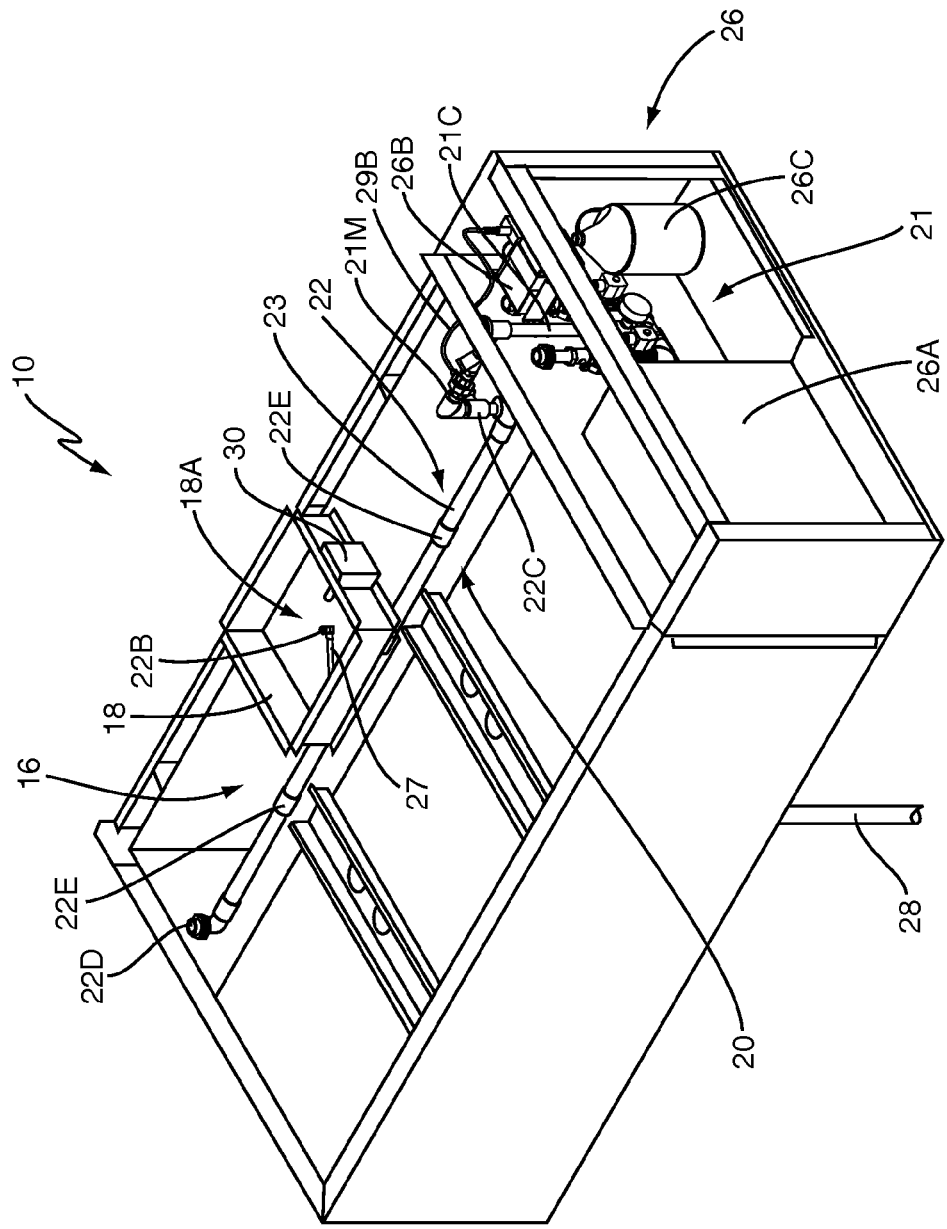
FIG. 2 is a perspective of the kitchen hood assembly with a top portion thereof removed to better illustrate the combination cleaning and fire suppression system.
Figure 3:
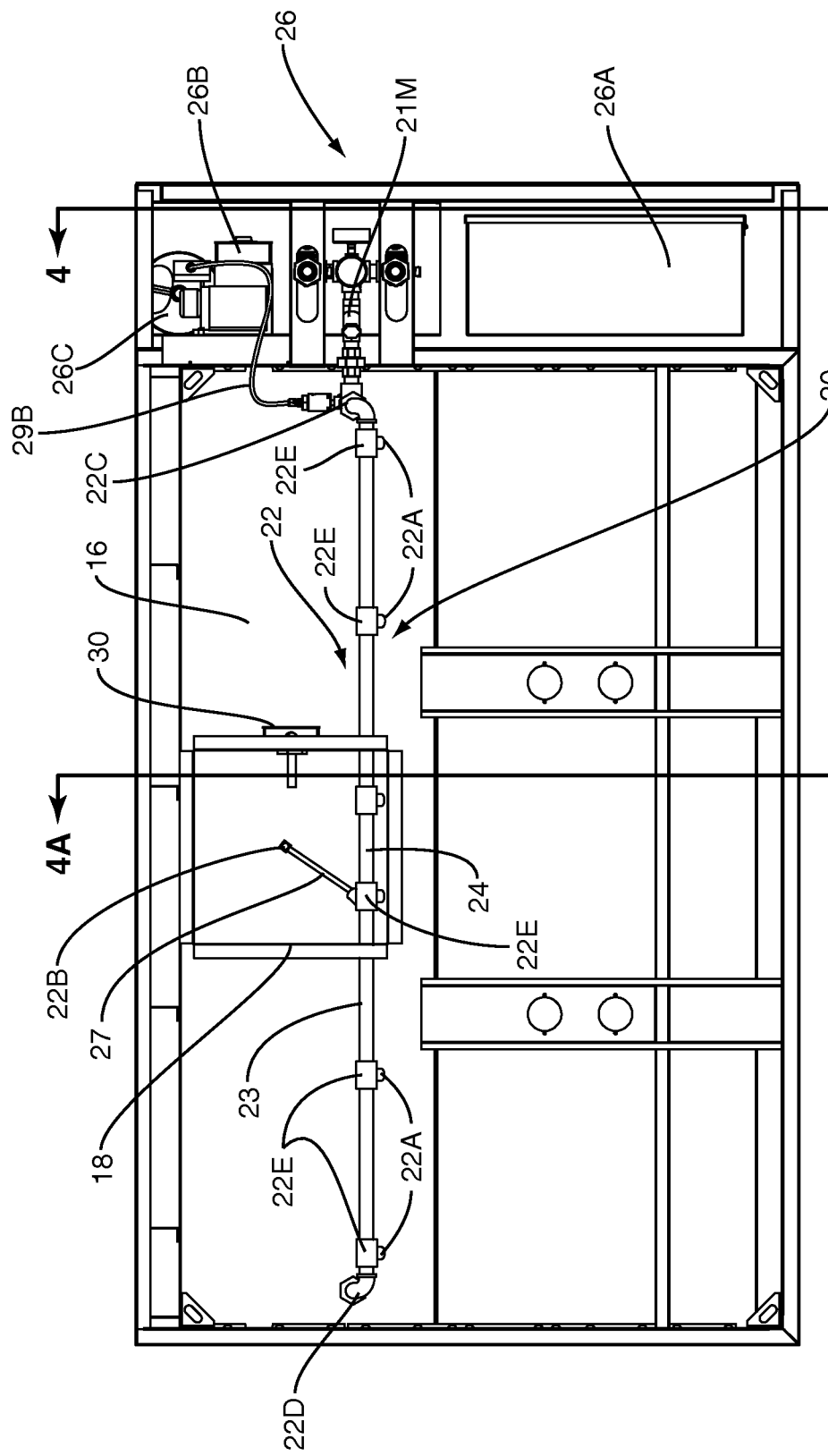
FIG. 3 is a top plan view of the kitchen hood with a top portion removed to better illustrate internal components of the hood.
Figure 4:
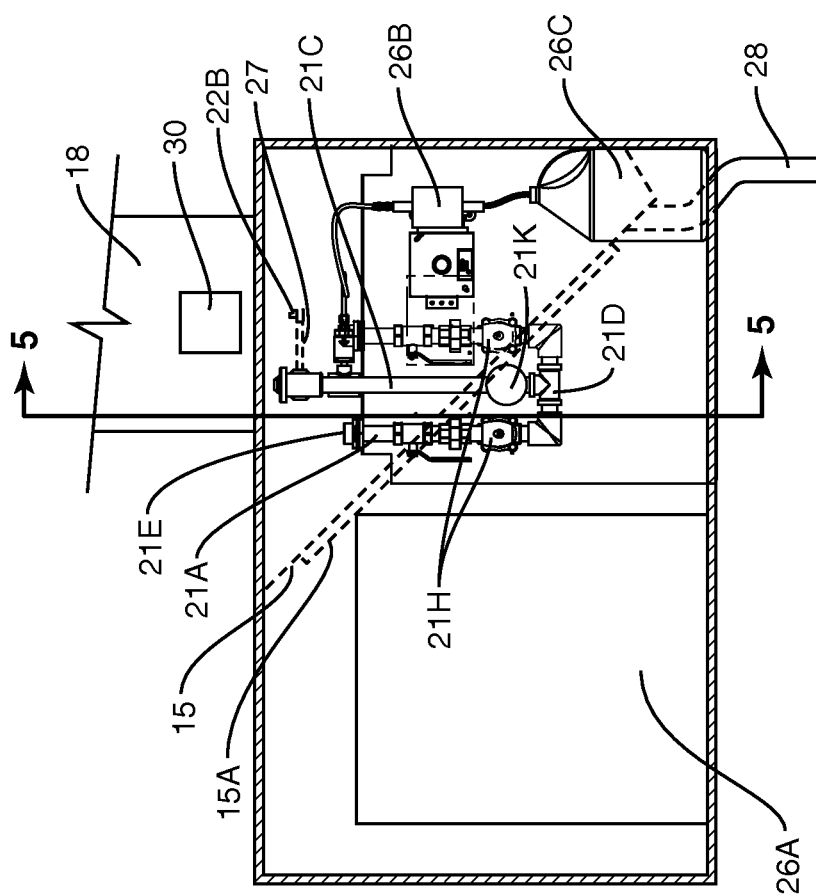
FIG. 4 is a side sectional view of the kitchen hood assembly taken through the line 4-4 of FIG. 3.

With further reference to the drawings, the kitchen hood assembly of the present invention is shown therein and indicated generally by the numeral 10. As illustrated in FIG. 1, kitchen hood assembly 10 comprises a housing 12 generally defining the outer structure. Disposed within hood assembly 10 is a combination cleaning and fire suppression system 20 comprising a spray bar 22 and a control system 26 as shown in FIGS. 2, 3, and 4.

Figure 4A:
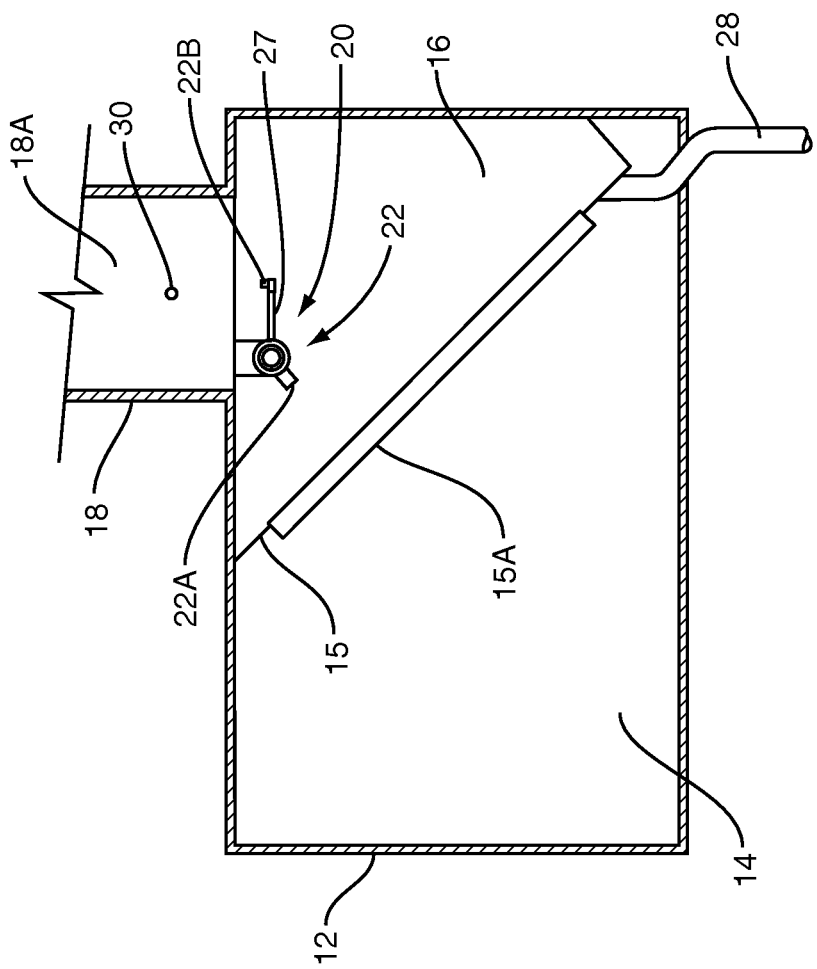
FIG. 4A is a side sectional view of the kitchen hood assembly taken through the line 4A-4A of FIG. 3.
Figure 5:
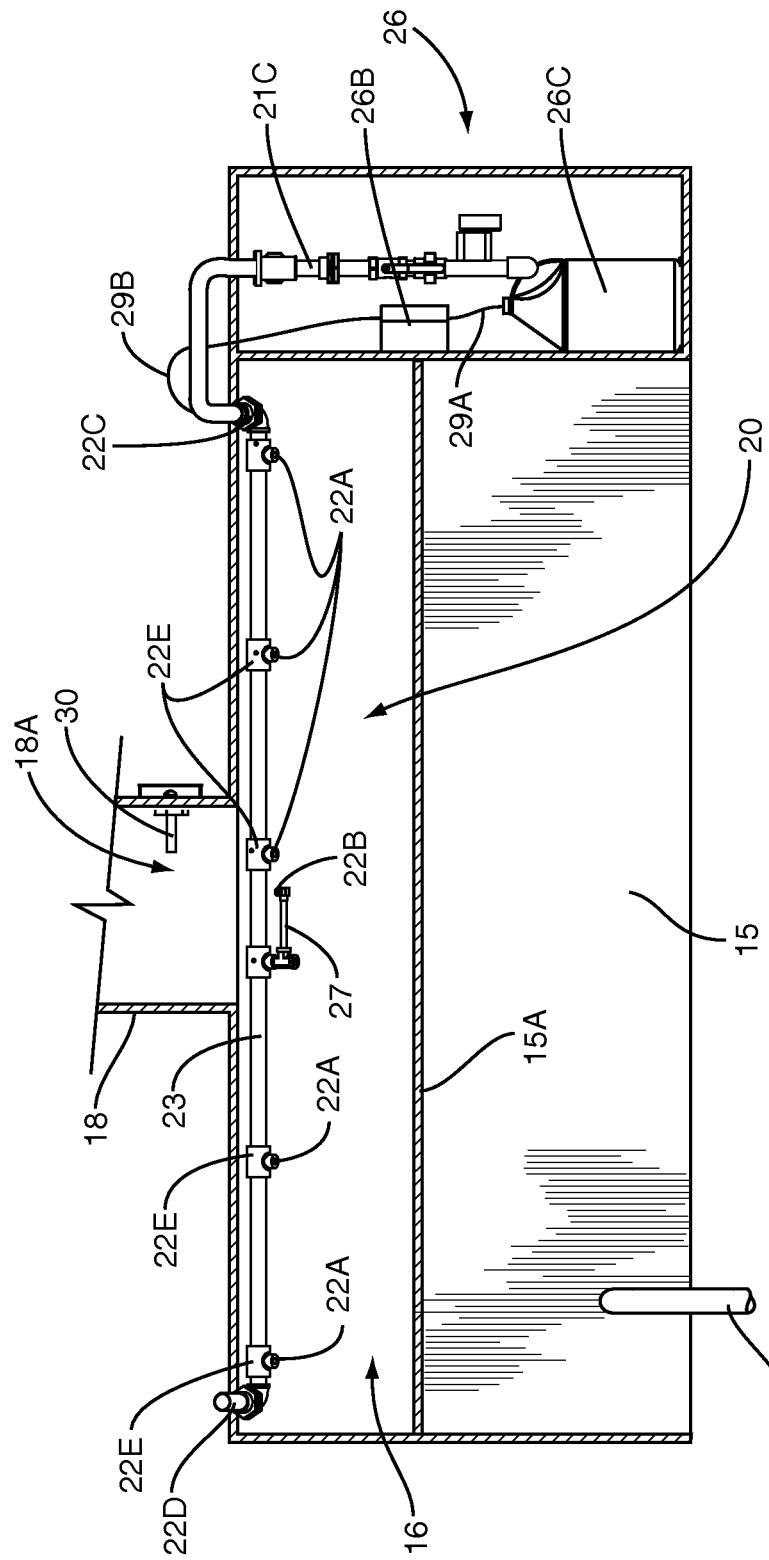
FIG. 5 is a front sectional view of the kitchen hood assembly with the combination cleaning and fire suppression system.

Turning now to a more detailed description of kitchen hood assembly 10, housing 12 encloses a vapor entrainment area 14 comprising a portion of the interior of the housing as illustrated in FIG. 1. In a typical application, kitchen hood assembly 10 is mounted such that it is spaced above a cooking surface or similar device in order that vapors produced in cooking are entrained upwards into vapor entrainment area 14. Kitchen hood assembly 10 includes a grease confinement area 16 that is separated from vapor entrainment area 14 by an inclined panel 15 as shown particularly in FIGS. 2 and 4A. Mounted within panel 15 is a filter 15A through which the entrained vapors may flow into grease confinement area 16. Mounted to an upper portion of hood assembly 10 and in fluid communication with grease confinement area 16 is a riser or duct 18 extending away from the hood assembly. Riser 18 includes an interior 18A to receive vapors from grease confinement area 16 and conduct the vapors away from hood assembly 10. An exhaust blower is disposed in fluid communication with riser 18. The exhaust blower maintains a draft through riser 18 to facilitate entraining vapor in vapor entrainment area 14 and directing the vapors through filter 15A into grease confinement area 16 and subsequently through riser 18 to be exhausted away from hood assembly 10.

Disposed within grease confinement area 16 is a portion of the combination cleaning and fire suppression system 20. Spray bar 22 extends generally transversely across an upper portion of the grease confinement area 16. See FIGS. 2 and 3.

Spray bar 22 includes a series of spaced-apart nozzles 22A and at least one riser nozzle 22B. Nozzles 22A are typically angled to direct spray to the inner surfaces of the grease confinement area 16. Nozzles 22A may, however, be directed at various angles and all nozzles need not be directed in the same direction. Each nozzle 22A has a spray pattern, spacing, and direction such that a spray of an appropriately pressurized aqueous liquid, such as water and a surfactant, from the nozzles impinges on the interior surfaces of grease confinement area 16 to remove contaminants, including grease and generally clean the hood in this area. At least one nozzle 22B is positioned to align with the center of the horizontal cross-section of riser 18. See FIGS. 2, 3, and 4A. Nozzle 22B is directed generally upward such that a spray of an appropriately pressurized liquid from the nozzle is directed into the center of riser 18.

In one embodiment, spray bar 22 includes a series of pipe segments 23 connected together by a series of tees 22E as illustrated particularly in FIG. 3. Nozzles 22A and 22B are associated with the tees 22E. Note that the riser nozzle 22B is generally oriented in position to direct an aqueous liquid into the riser 18. Spray bar 22 in the embodiment illustrated in FIG. 3 is offset with respect to the center of riser 18. In order to position nozzle 22B generally centrally with respect to the riser 18, there is provided an arm 27 that extends between the tee 22E and the nozzle 22B.

Figure 6:
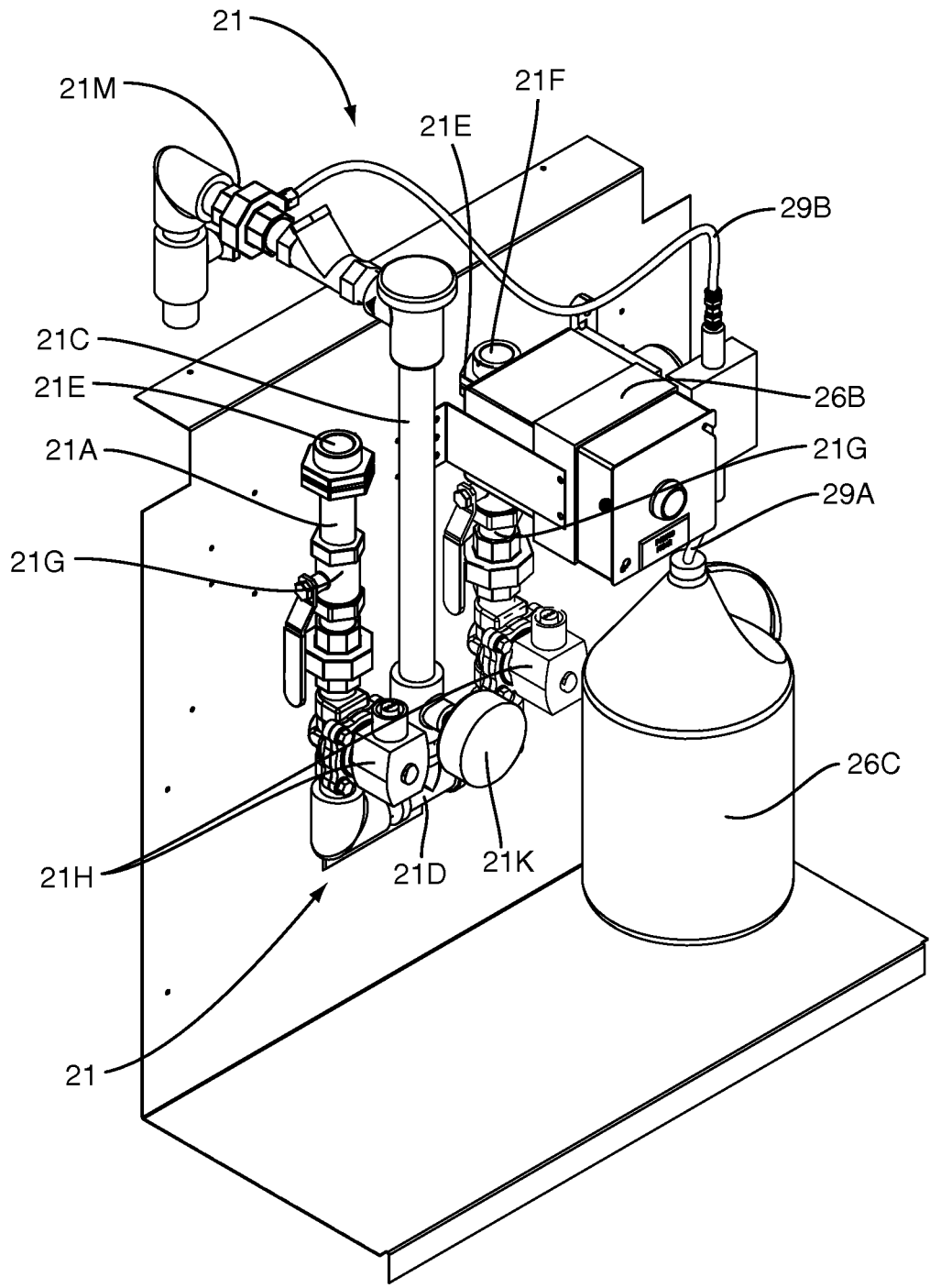
FIG. 6 is a fragmentary perspective view of the kitchen hood assembly showing the control system.

Turning now to control system 26 (FIG. 6), the control system includes a manifold 21 (FIG. 6) for connecting spray bar 22 to a source of water, a surfactant controller 26B, and a surfactant reservoir 26C. Manifold 21 is constructed generally of pipe and fittings by common methods. The configuration of manifold 21, in one embodiment, includes a pair of vertically-oriented tubular inlet legs 21A, 21B and a vertical tubular outlet leg 21C (FIG. 6). The vertically-oriented legs 21A, 21B, 21C are connected and in fluid communication with a horizontal connector 21D. Water from two sources may thus be provided to manifold 21. For example, heated water may be directed into inlet 21E of leg 21A and unheated water may be directed into inlet 21F of leg 21B. The heated and unheated water is directed through manual shut-off valves 21G (one in each of legs 21A, 21B) and electronic solenoid valves 21H (one in each of legs 21A, 21B) into connector 21D from whence the mixed heated and unheated water is directed into leg 21C and into spray bar 22. It is noted that spray bar 22 is in fluid communication with leg 21C by an upper connector 21M.

As noted above, each leg 21A, 21B includes a manual shutoff valve 21G and an electric solenoid valve 21H. Leg 21C includes a temperature sensor 21K. Control system 26 may include the capacity to respond to a desired temperature set point and adjust the flow of heated and unheated water to obtain and maintain the temperature of the water flowing in leg 21C at a certain temperature or within a temperature range.

Control system 26 also includes a surfactant injection apparatus to inject surfactant into the water directed to spray bar 22. In one embodiment, the apparatus includes a surfactant pump system 26B and a surfactant reservoir 26C. The pump inlet is fluidly connected to reservoir 26C by tube 29A, and the pump outlet is connected to connector 21M by tube 29B. It is appreciated that a check valve may be interposed between the connection of tube 29B to connector 21M and surfactant pump system 26B to prevent backflow through the surfactant pump system.

Control system 26 further includes commonly known circuitry and logic for activating system 20 by admitting supply water into the system for a set or desired time period. During the time period that water is being injected into cleaning and fire suppression system 20, control system 26 controls the amount of surfactant injected by surfactant pump 26B.

The cleaning and fire suppression system 20 further includes a fire sensor 30 that is mounted on riser 18, or in an area in the hood, such that the sensor is operative to be activated by a fire in interior 18A of the riser 18 or grease confinement area 16. In one embodiment, fire sensor 30 includes an active sensing element extending at least partially into interior 18A. Fire sensor 30 may be of various extant designs that provide an electrical signal that may be used to initiate operation of combination cleaning and fire suppression system 20 in the event of a fire being detected as will be discussed here below.

Figure 7:
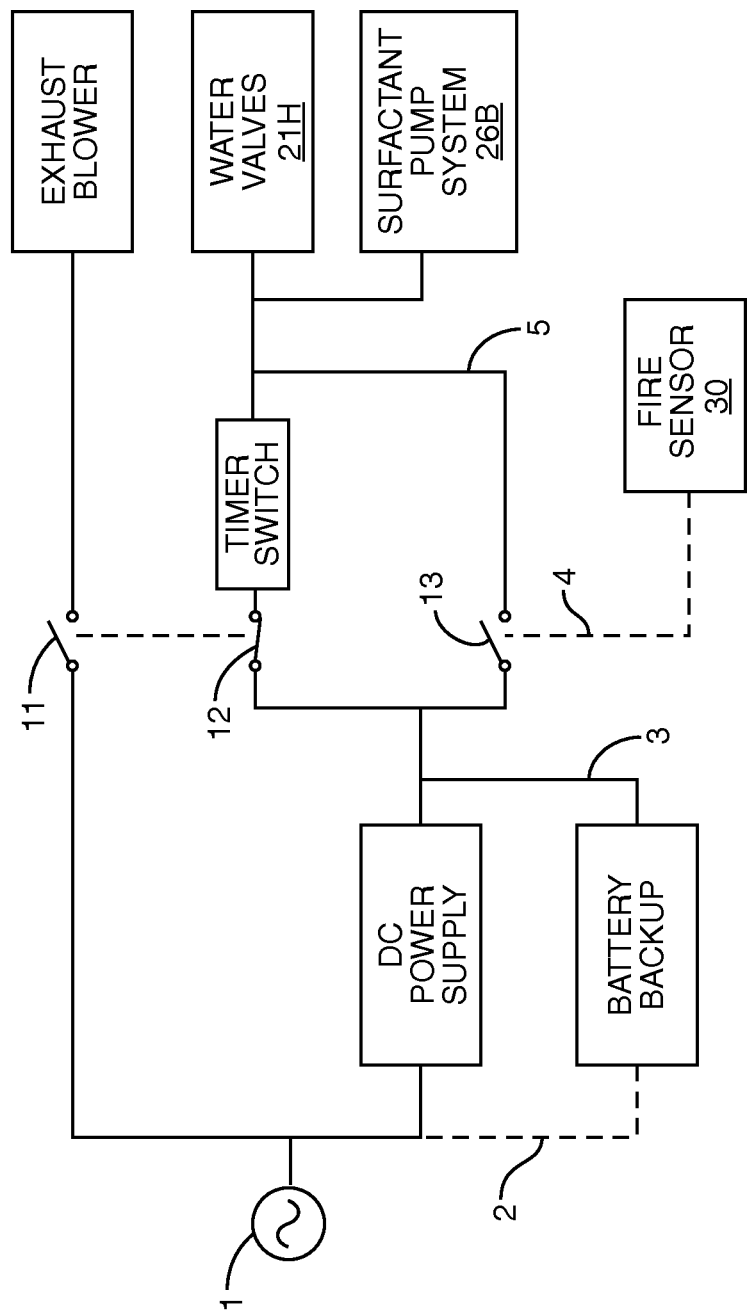
FIG. 7 is a schematic illustration of the control system.

A control schematic for control system 26 that enables both hood cleaning and fire suppression is illustrated in FIG. 7. Components that make-up the controls may, in one embodiment, be housed within control system cabinet 26A (FIG. 2). The elements include an uninterruptible power supply or battery back up device that is operable to automatically maintain power to the system during a power outage. Electrical power from AC supply 1 is supplied to a DC power supply which in turn provides DC electrical power for control system 26. Typically, the hood exhaust blower is powered by an AC motor and is controlled by a manual shut-off switch 11. Also typically, the control elements require DC electrical power that may be provided by the DC power supply and battery back-up device. The battery back-up device includes the capability to sense the state of AC supply 1, that capability indicated by dashed line 2. When a power outage is detected, the battery back-up supplies via line 3 the DC power to maintain operation of cleaning and fire suppression system 20 during the power outage. Exhaust blower shut-off switch 11, which generally is a manually actuated on-off switch, is coupled to a wash switch 12 such that closing switch 11 opens switch 12, and opening switch 11 closes switch 12. The coupling of switches 11 and 12 may be of various known forms including a mechanical linkage and electrical relays. With switches 11 and 12 thus coupled, when the exhaust blower is operating, cleaning with cleaning and fire suppression system 20 is not normally energized. This is the normal operation of hood 10 in which, for example, cooking of foods is occurring under or near the hood. The exhaust blower may be de-energized by manually opening switch 11 as would, for example, be the case at the end of a cooking period. When switch 11 is opened, switch 12 closes and energizes water valves 21H to admit water into manifold 21 and surfactant pump system 26B to provide surfactant such that cleaning and fire suppression system 20 performs a cleaning cycle for range hood assembly 10. In one embodiment, a timer switch is provided in series with switch 12 and is operable to de-energize water valves 21H and surfactant pump 26B upon completing a desired or set cleaning period. In the example just discussed, the power supply is DC. However, it is appreciated that AC power could be used to power the control system 26 shown in FIG. 7. Various components of the system would be changed to make them AC compatible. Further, a back-up power source, such as an AC generator, could be used.

Fire sensor 30 is coupled to a fire switch 13, the coupling symbolically indicated in FIG. 7 by dashed line 4. When a fire in range hood 10 occurs, fire sensor 30 closes fire switch 13 to energize water valves 21H and surfactant pump 26B. Line 5 connects to switch 13 and effectively interconnects the DC power supply and battery back-up to the water valves 21H and surfactant pump system 26B. This connection by-passes switch 12 and the timer switch. Whether the exhaust blower is energized or not, should a fire be sensed by fire sensor 30, fire switch 13 closes and energizes valves 21H and pump system 26B for fire suppression. Thus energized, water and surfactant is sprayed into hood assembly 10, including into riser 18, to suppress the fire. A manual reset feature of common design may be provided to de-energize cleaning and fire suppression system 20 when the fire is suppressed. Alternatively, when the level of fire suppression is such that fire sensor 30 no longer senses a fire, switch 13 may be configured to open and de-energize valves 21H and surfactant pump system 26B.

It is appreciated that cleaning and fire suppression system 20 functions similarly during cleaning and fire suppression. Once energized, whether by manual shut-off of hood assembly 10 or by a fire being sensed by fire sensor 30, system 20 functions the same way using the same aqueous liquid.

To be effective in cleaning hood assembly 10, cleaning and fire suppression system 20 may be supplied with water having a temperature between about 140° F. and about 170° F. To be effective in cleaning and fire suppression, water pressure may be maintained at about 30 psi. Nozzles 22A can provide a flow of about 0.7 gpm at 30 psi. Riser nozzle 22B may be rated to provide 2.4 gpm at 30 psi. In a typical application, nozzles 22A are equivalent to Macola Model No. 2591 or 2592 and nozzles 22B are equivalent to Macola Model No. 2593. All plumbing is brass pipe or tube. Spray bar 22 comprises ¾" pipe nipples 23 and 24, tees 22E, and elbows. Riser nipple 27 comprises ¼" tubing or pipe and commonly available fittings to connect to spray bar 22. In a typical application, pipe nipples 23 are about 12" long and provide for nozzles 22A to be spaced apart about 13" and preferably spaced at between 12½" and 13½". It is appreciated that all of these sizes discussed above can vary and will probably vary depending upon application. Fire suppression sensor 30 should be of a design capable of sensing the presence of fire typical of range hood systems. Fire sensors are well known in the art and are commercially available. Hood drain 28 is typically formed of brass pipe and fittings. In one embodiment, 1½" pipe is used in forming hood drain 28, and the hood drain extends at least 72" away from hood assembly 10.

Commonly available surfactants may be used and function also as detergents. Generally, during cleaning or fire suppression, control system 26 provides for surfactant to be injected for 1 second for every minute of operation. The surfactant is effective in the fire suppression mode to knockdown the fire. The amount of surfactant administered during a fire and the time period for injecting a surfactant can vary. However, in a preferred design and process, surfactant is continuously injected into the water stream in a fire situation.

Figure 8:
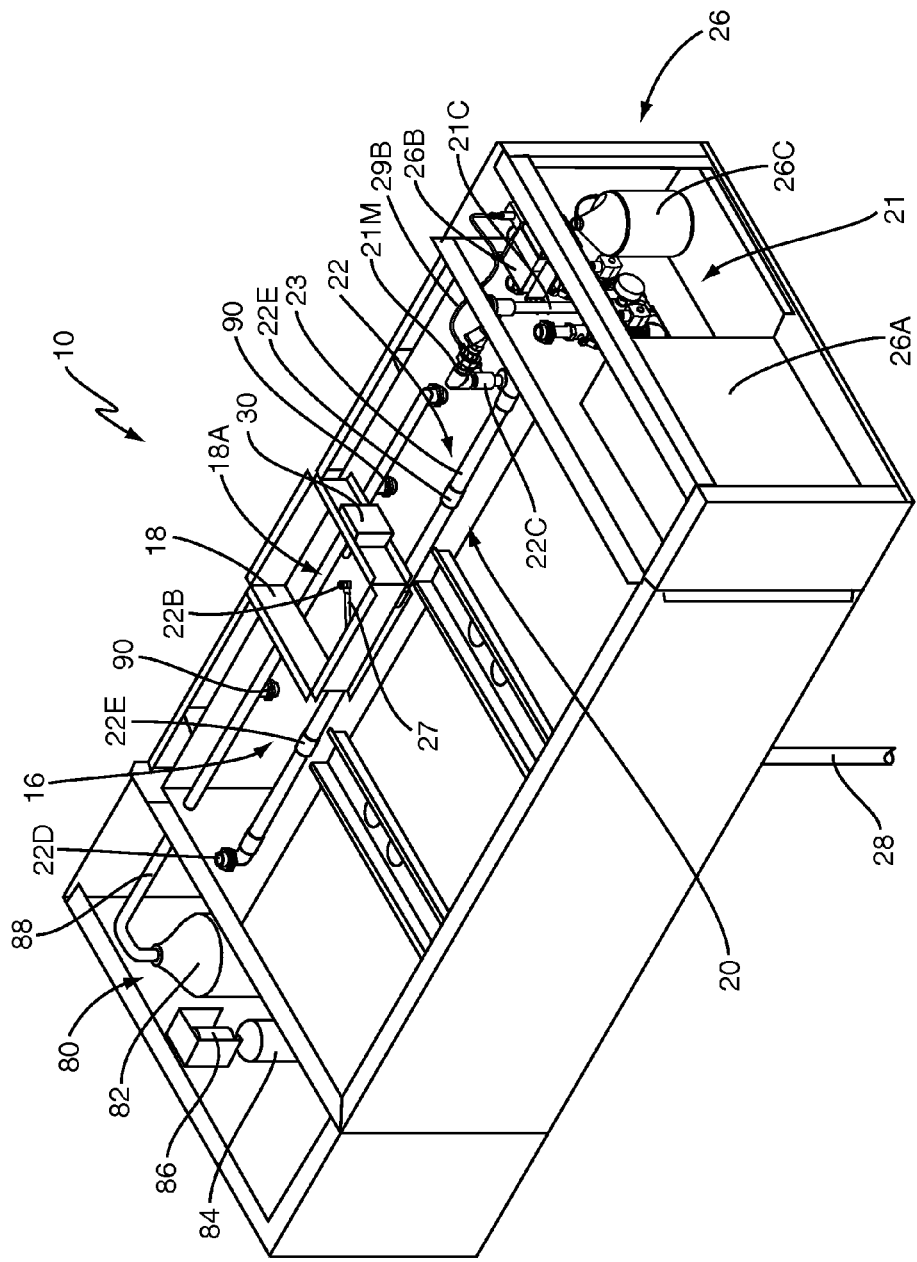
FIG. 8 is a perspective of the kitchen hood assembly with a top portion thereof removed to illustrate the combination cleaning and fire suppression system with the addition of a chemical fire suppression system.

Since all types of fires may not be adequately contained using the water/surfactant mixed fire suppression system (hereinafter, "core fire suppression system") discussed above, an alternative embodiment for fire suppression is presented and illustrated in FIG. 8. FIG. 8 illustrates the kitchen hood 10 with the combination cleaning and fire suppression system shown in FIG. 2. However, the kitchen hood in FIG. 8 includes the addition of chemical suppression system 80 to be used alone or in parallel with the core fire suppression system when a fire is detected. Various types of chemical fire suppressants can be used in chemical fire suppression system 80, but one that is typically employed is an ANSUL system.

Chemical fire suppression system 80 is integrated into the kitchen hood assembly and includes a pressurized gas tank 84 (i.e. a cylinder of $CO_2$), solenoid valve 86, chemical fire suppressant reservoir 82, conduit 88 and a series of nozzles 90. Solenoid valve 86 is operatively connected to gas tank 84. Chemical fire suppressant reservoir 82 is disposed between solenoid valve 86 and the series of nozzles 90 and is operatively coupled to the nozzles by conduit 88. Upon detection of a fire, solenoid valve 86 is energized, opening gas tank 84 allowing the pressurized gas to be released into the chemical suppressant reservoir 82. The pressurized gas propels the chemical fire suppressant through conduit 88, out the series of nozzles 90 and into the kitchen exhaust hood, spraying the fire with the chemical fire suppressant and extinguishing the fire.

Control System for Actuating Fire Suppression Devices and Monitoring the Integrity of the Fire Suppression Systems With the understanding of the embodiments described above where a kitchen exhaust hood contains a chemical fire suppression system and combination cleansing/core fire suppression system, a control system for actuating the fire suppression devices and for monitoring the integrity of the fire suppression systems will now be described.

Figure 9:
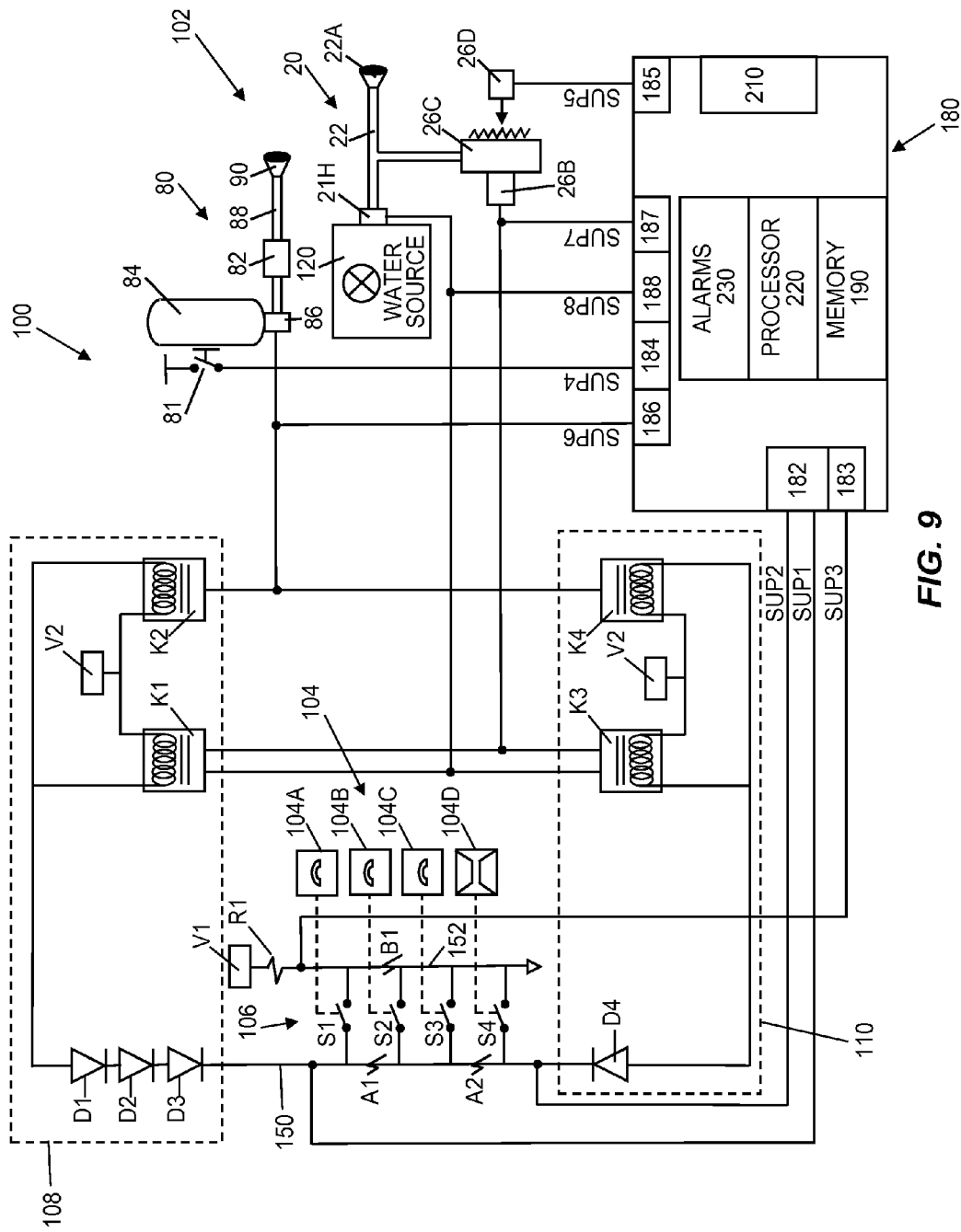
FIG. 9 is a schematic illustration of the fire suppression system and supervision module.

With reference to FIG. 9, a fire suppression control system 100 is integrated with control system 26 and housed inside cabinet 26A, as shown. Fire suppression control system 100 contains an activation module for actuating fire suppression devices 102 and supervision module 180 for monitoring the system, described in detail below.

Activation module includes a series of fire sensors and manual actuators 104, a switching circuit 106, first and second actuating circuits, referenced 108 and 110 respectively. Activation module is operatively connected to the plurality of fire suppression devices 102 and is operative to detect a fire and control the fire suppression devices.

Supervision module 180 includes a series of monitoring circuits which are operative to monitor and control certain aspects of the fire suppression control system 100. Typical monitoring circuits are utilized to sense the physical presence of various fire suppression devices 102, monitor the electrical connectivity of the various fire suppression devices 102, and monitor the integrity of connections within fire suppression control system 100. Supervision module is also capable of storing the information collected for retrieval or transmission to a remote site.

As previously discussed, fire suppression devices 102 include both a chemical fire suppression system 80 and a core fire suppression system 20. Core fire suppression system 20, includes a source of pressurized water 120, operatively connected to solenoid valve 21H that directs water through spray bar 22 and out nozzles 22A. As previously discussed a surfactant is integrated into core fire suppression system 20. The surfactant is stored in surfactant reservoir 26C and is injected into spray bar 22 by pump 26B such that a mixture of water and surfactant is sprayed onto a fire.

Chemical fire suppression system 80 includes pressurized gas tank 84 (i.e. a cylinder of $CO_2$ or other pressurized gas), solenoid valve 86, chemical fire suppressant reservoir 82, conduit 88 and a series of nozzles 90. Solenoid valve 86 is operatively connected to gas tank 84 and is energized when any of the series of fire sensors or manual actuators 104 are triggered by the detection of a fire. Chemical fire suppressant reservoir 82 is disposed between solenoid valve 86 and the series of nozzles 90, and is operatively coupled to the nozzles 90 by conduit 88. Upon detection of a fire, solenoid valve 86 opens gas tank 84 allowing the pressurized gas to be released into the chemical suppressant reservoir 82. The pressurized gas propels the chemical fire suppressant through conduit 88, out the series of nozzles 90 and into the kitchen exhaust hood, spraying the fire with the chemical fire suppressant and extinguishing the fire.

FIG. 9 shows a series of fire sensors and manual actuators 104, including a series of fire sensors 104A-104C and a manual actuator. Each of the fire sensors 104A-104C is capable of automatically sensing the presence of fires. Whereas, manual actuator 104D, such as a manual pull-down station, must be physically actuated by a person. It should be understood that although FIG. 9 illustrates three fire sensors and a single pull-down station there could be many more fire sensing devices and pull-down stations distributed throughout the commercial kitchen.

Switching circuit 106 includes a first conductor 150 in parallel with a second conductor 152, and a series of parallel switches S1-S4 connected there between. As illustrated by the dotted lines in FIG. 9, switches S1-S4 are operatively connected to fire sensing devices 104A-104C and manual pull-down station 104D. For example, switch S1 is operatively connected to fire sensing device 104A, while switch S4 is operatively connected to manual pull-down station 104D. Furthermore, in the embodiment shown, second conductor 152 is connected to a voltage supply V1 through resistor R1 at one end and to an electrical ground potential at the other end. In this embodiment, first conductor 150 is maintained at a voltage supply V2, such that the voltage potential of V2 is higher than the voltage potential of V1, as explained in detail in the coming paragraphs.

As seen in FIG. 9, first actuating circuit 108 is operatively interconnected between first conductor 150 of switching circuit 106 and the fire suppression devices 102. First actuating circuit 108 includes actuators K1 and K2, a series of diodes D1-D3 and an input for voltage supply V2. In some embodiments, first actuating circuit 108 includes more than the three diodes D1-D3 shown in FIG. 9. Actuators K1 and K2, which could be electro-mechanical switches such as relays, react to the closing of any one of switches S1-S4 by actuating the fire suppression devices 102.

Similarly, second actuating circuit 110 is operatively connected to the first conductor 150 at a point spaced apart from the connection of the first actuating circuit 108 and is disposed between switching circuit 106 and fire suppression devices 102. Second actuating circuit 110 includes an input for voltage supply V2 and includes actuators K3 and K4 and diode D4. In some embodiments, second actuating circuit 108 includes more diodes than the single diode shown in FIG. 9. In a preferred embodiment, the number of diodes in the second actuating circuit 110 should be different than the number of diodes in the first actuating circuit 108. Actuators K3 and K4, which could be electro-mechanical switches such as relays, also react to the closing of any one of switches S1-S4 by actuating the fire suppression devices 102.

During a normal mode of operation, in the embodiment shown in FIG. 9, the detection of a fire by fire sensing device 104A initiates the closing of switch S1. The closing of S1 causes a low resistance path from first conductor 150 to second conductor 152, which causes a current to flow through actuators K1, K2, K3, and K4. Current flow through the actuators K1 and K3 triggers the actuation of core fire suppression system 20, via solenoid 21H and pump 26B. Likewise, the current flow through actuators K2 and K4 triggers the actuation of the chemical fire suppression system 80, via solenoid 86.

Additionally, the closing of S1 causes the voltage on supervision lines SUP1 and SUP2 to drop below a predetermined threshold. The voltage drop is detected by monitoring circuit 182. Upon detection of the voltage drop, monitoring circuit 182 initiates a timer which ensures that actuators K1-K4 remain energized for a predetermined amount of time or until a manual reset is detected. The timer could be realized with a standard timing circuit (not shown) or could be realized with more complex circuitry contained within supervision module

180. Of course, fire suppression control system 100 will react to the closing of any one of switches S1-S4 in the same manner.

Fire suppression control system 100 has the added feature of built-in redundancy and is capable of properly reacting to the detection of a fire even in the event of a break in the first or second conductors, 150 or 152. In this case, the actuating circuits responsible for triggering of the actuation of the core fire suppression system 20 and the chemical fire suppression system 80 are dependent on location of the break. For example, in the event of a break in the first conductor 150 at location A1, closing of any one of switches S2-S4 provides a low resistance path from first conductor 150 to second conductor 152 for actuators K3 and K4 only. This causes current to flow only through actuators K3 and K4, triggering the actuation of the core fire suppression system 20 and chemical fire suppression system 80. Alternatively, the closing of switch S1 provides a low resistance path from first conductor 150 to second conductor 152 for actuators K1 and K2 only. This causes current to flow only through actuators K1 and K2 triggering the actuation of the core fire suppression system 20 and chemical fire suppression system 80 via the actuators K1 and K2 only.

Likewise, a break in first conductor 150 at location A2 is handled in a similar manner. In this example, closing of any one of switches S1-S3 will trigger the actuation of the core fire suppression system 20 and chemical fire suppression system 80 via actuators K1 and K2 only and the closing of switch S4 will trigger the actuation of the core fire suppression system 20 and chemical fire suppression system 80 via actuators K3 and K4 only.

Similarly, fire suppression control system 100 has the added advantage of built-in redundancy and proper operation even in the event of a break in the second conductor 152. For example, consider a break in second conductor 152 at the location marked B1. In this condition the closing of either switches S1 or S2 will still allow current to flow through actuators K1 and K2 since, as previously discussed, the voltage supply V1 is maintained at a voltage potential which is less than voltage supply V2. Similarly, the closing of switches S3 and S4 provide a path to ground and allow current to flow through actuators K3 and K4.

It should be understood that even though the fire suppression control system 100 includes built-in redundancy to ensure proper operation in the event of a break in either the first or second conductors 150, 152, other faults in the construction or maintenance of the fire suppression system can cause failures and faults in the operation. To mitigate the chances of the system not operating properly in the event of a fire, the fire suppression control system also includes supervision module 180.

As briefly discussed above, supervision module 180 includes a series of monitoring circuits operative to monitor and control certain aspects of the system. In one embodiment, supervision module includes a plurality of monitoring circuits selected from a group of monitoring circuits. The group of monitoring circuits includes monitoring circuit 182 for monitoring the integrity of the first conductor 150, monitoring circuit 183 for monitoring the integrity of the second conductor 152, monitoring circuit 184 for sensing the correct physical presence of gas tank 84, and monitoring circuit 185 for determining the liquid level of the surfactant contained in surfactant reservoir 26C. The group of monitoring circuits also includes monitoring circuits 186, 187, and 188 for determining whether solenoid 86, pump 26C and solenoid 21H respectively are electrically connected to a voltage supply. As shown in FIG. 9, supervision module 180 also includes memory block 190 and communication block 210.

Along with detecting the closing of any one of switches S1-S4 in switching circuit 106 and initiating a timer, monitoring circuit 182 also determines the integrity of the first conductor 150. In the embodiment shown in FIG. 9, this is done by monitoring the voltage at points SUP1 and SUP2 on first conductor 150. The integrity of first conductor 150 is determined based on the difference in voltage between the points SUP1 and SUP2. For example, in the embodiment shown in FIG. 9, a break in the first conductor produces a measured voltage difference where the voltage on SUP1 is less than the voltage potential on SUP2. This is due to the first actuating circuit 108 having more diodes D1-D3 connected to the first conductor 150 than second actuating circuit 110. The opposite would be true if the second actuating circuit had more diodes connected to the first conductor 150 than the first actuating circuit. In this case, a break in the first conductor is indicated by the voltage on SUP1 being greater than the voltage on SUP2. Of course, a non-broken first conductor 150 results in the no voltage difference between SUP1 and SUP2.

Likewise, monitoring circuit 183 determines the integrity of the second conductor 152 by measuring the voltage potential on line SUP3. This embodiment is also shown in FIG. 9. For example, assuming that voltage supply V1 maintains a voltage potential of 3.3 volts and resistor R1 is 10 kilo-ohms, a small current of 330 micro-amps flows through the second conductor 152, but the voltage potential on SUP3 would have a potential at or near the ground reference when the second conductor 152 does not have a break. In contrast, a break in second conductor 152 forms an open circuit, thus stopping the current flow. In this situation, the voltage potential measured at SUP3 is pulled upward towards the voltage potential V1. Thus a measurement in the range of 3.3 volts on SUP3 indicates that there is a break somewhere in the second conductor 152.

Monitoring circuit 184 senses the physical presence of gas tank 84 by monitoring the state of a mechanical switch 81 via signal line SUP4. When the gas tank 84 is properly seated within the chemical fire suppression system 80, mechanical switch 81 is maintained in a closed state. The closed state of mechanical switch 81 can be detected by monitoring circuit 184 in any number of ways. For example, the closed state of mechanical switch 81 could cause a voltage potential to be measured. On the other hand, when gas tank 84 is not seated properly, mechanical switch 81 remains in an open state. The detection by monitoring circuit 184 of an improper position of gas tank 84 could be indicated by various methods, such as flashing lights, audible alarms, or by sending alert emails or text messages via communication circuit 210.

Monitoring circuit 185 determines the liquid level of the surfactant contained within surfactant reservoir 26C by monitoring the position of float sensor 26D via signal line SUP5.

Monitoring circuits 186, 187, and 188 are used to determine whether solenoids 86 and 21H and pump 26B, respectively, are electrically connected to a voltage supply by passing a small current the devices to verify the devices and their wiring are intact.

Memory block 190 is operatively connected to all the monitoring circuits within supervision module 180 and is used to store information collected from monitoring circuits for later retrieval or transmission to a remote server. Memory block 190 can be realized in any number of forms, such as a Flash memory, SRAM, DRAM, or any other form of storage medium.

An alarm block 230 is included in the embodiment shown in FIG. 9. Alarm block is configured to notify appropriate personnel of faults detected by monitoring circuits in the supervision module 180. Alarm block 230 includes various alarm and alert mechanisms, such as flashing lights, audible alarms, or by triggering the sending of emails or text messages which alert the appropriate personnel of the detection of a fault.

Processor 220 is also included in the embodiment shown in FIG. 9. Processor 220 is operatively connected between memory block 190 and alarm block 230. Processor 220 retrieves information collected by the monitoring circuits from memory block 190 and determines which, if any, of the alarms and alerts mechanisms inside alarm block 230 need to be triggered. The seriousness of the fault is also determined by the processor. For example, if monitoring circuit 185 detects that the liquid level is below a predetermined threshold, processor 230 might trigger a flashing light. Whereas, if monitoring circuit 184 indicates that gas tank 84 is not correctly positioned, processor 230 might trigger an audible alarm.

In some embodiments a communication block 210 is included in supervision module 180. Communication block 210 is operatively connected to memory block 190 and is communicatively linked to a monitoring internet server (not shown) that could be remote from the commercial kitchen. The internet server could include information databases with unique identifiers, such as a Media Access Control (MAC) addresses identifying individual kitchen hood assemblies, such that an entire kitchen network containing multiple kitchens can be continuously monitored by a single internet server. In this case, the internet server can detect faults or problems at a particular kitchen location and can actuate various alarms at that location, or direct messages to appropriate people concerning the status of the fire suppression control system 100 and the fire suppression devices 102.

There are many advantages to the new kitchen hood assembly of the present invention. One principal advantage is that the kitchen hood assembly utilizes substantially the same structure and system for both cleaning the hood assembly and for fire prevention. Also, it should be pointed out that the kitchen hood assembly disclosed herein and the fire suppression system is fully certified to Standard UL300.

Other aspects of various embodiments of the inventive apparatus and related methods are also disclosed in the following description. The various aspects may be used alone or in any combination, as is desired.

What is claimed is:

1. A kitchen hood assembly having a fire suppression system with built in redundancy comprising:
   a kitchen exhaust hood;
   one or more fire suppression devices associated with the kitchen exhaust hood for extinguishing a fire within the vicinity of the exhaust hood;
   a series of fire sensors or manual actuators associated with the one or more fire suppression devices;
   a switching circuit including first and second parallel conductors and a series of parallel switches connected between the conductors;
   each switch of the switching circuit being linked to one of the fire sensors or manual actuators such that the actuation of one of the fire sensors or manual actuators causes one of the switches of the switching circuit to be actuated;
   a first actuating circuit operatively interconnected between the first conductor of the switching circuit and the fire suppression devices for actuating the fire suppression devices;
   a second actuating circuit operatively interconnected between the first conductor of the switching circuit and the fire suppression devices for actuating the fire suppression devices;
   a voltage input for enabling a voltage to be applied to the first and second actuating circuits; and
   wherein the switching circuit and first and second actuating circuits are configured such that a break at one point on the first conductor, including a break at a point between any two points where the switches of the switching circuit connect to the first conductor, enable the first or second actuating circuits to actuate the one or more fire suppression devices in response to any one of the fire sensors or manual actuators actuating any one of the switches of the switching circuit.

2. The kitchen hood assembly of claim 1 wherein the first and second actuating circuits are connected at spaced apart points on the first conductor and the series of parallel switches are connected at points in between where the first and second actuating circuits are connected.

3. The kitchen hood of claim 1 wherein the switching circuit has a open state where all of the series of switches are open and a closed state where at least one of the series of switches is closed, and wherein in the open state the first conductor is configured to have a higher voltage potential than the second conductor.

4. The switching circuit of claim 3 wherein the second conductor is a ground reference.

5. The fire suppression system of claim 1 wherein the first actuating circuit includes at least one electrical actuator and one or more diodes disposed between the electrical actuator and the first conductor, the second actuating circuit includes at least one electrical actuator and one or more diodes disposed between the electrical actuator of the second actuating circuit and the first conductor, and wherein the diodes of the first actuating circuit are disposed in an opposite direction of the diodes of the second actuating circuit.

6. The kitchen hood assembly of claim 1 wherein the one or more fire suppression devices comprise:
   a chemical fire suppression system comprising:
      a gas tank for holding a compressed gas;
      a chemical holding tank for holding a chemical fire suppressant;
      a chemical fire suppression distribution system; and
      a first solenoid disposed that upon actuation causes the compressed gas from the gas tank to drive the chemical fire suppressant from the chemical holding tank into the chemical fire suppression distribution system; and
   a core fire suppression system including:
      a core fire suppression distribution system for connecting to a water source and receiving water from the water source;
      a surfactant holding tank;
      a pump for injecting surfactant from the surfactant holding tank into the water; and
      a second solenoid that upon actuation causes water to enter the core fire distribution system.

7. The kitchen hood assembly of claim 1 further comprising a timing circuit operatively connected to the switching circuit and wherein upon actuation of the fire suppression devices the timing circuit causes the first and second actuating circuits to remain energized for a predetermined amount of time.

8. The kitchen hood assembly of claim 1 further comprising:

a supervision module including at least three monitoring circuits selected from the group including:
- a first monitoring circuit for monitoring the integrity of the first conductor of the switching circuit;
- a second monitoring circuit for monitoring the integrity of the second conductor of the switching circuit;
- a third monitoring circuit for sensing the presence of a gas cylinder associated with a chemical fire suppression device;
- a fourth monitoring circuit for determining whether a solenoid associated with the chemical fire suppression device is electrically connected to a voltage supply;
- a fifth monitoring circuit for determining whether a solenoid associated with a water based fire suppression device is electrically connected to a voltage supply;
- a sixth monitoring circuit for monitoring the liquid level within a surfactant tank; and
- a seventh monitoring circuit for determining whether a pump operative to pump surfactant from the surfactant tank is electrically connected to a voltage supply.

9. The kitchen hood assembly of claim 8 wherein the first monitoring circuit measures the voltage at two points on the first conductor and based on the difference in voltage determines the integrity of the first conductor.

10. The kitchen hood assembly of claim 8 wherein the second monitoring circuit measures the voltage on the second conductor and based on the measurement determines the integrity of the second conductor.

11. The kitchen hood assembly of claim 8 wherein the supervision module further comprises a communication interface circuit communicatively linked to a remote monitoring internet server.

12. The kitchen hood assembly of claim 8 where the supervision module further comprises:
- a memory circuit for storing information collected by the monitoring circuits;
- an alarm system for providing visual or audible alerts; and
- a processor operatively connected between the memory circuit and the alarm system; and
- wherein the processor is configured to retrieve information from the memory circuit and trigger the alarm system upon detection of a fault in the kitchen hood assembly.

13. The kitchen hood assembly of claim 8 where the supervision module further comprises:
- a memory circuit for storing information collected by the monitoring circuits;
- an alarm system for providing visual or audible alerts;
- a processor operatively connected between the memory circuit and the alarm system;
- a communication interface circuit operatively connected to the processor and communicatively linked to a remote monitoring internet server for sending alert messages; and
- wherein the processor is configured to retrieve information from the memory circuit and wherein upon detection of a fault in the kitchen hood assembly triggers the alarm system and directs the communication interface circuit to send an alert message to an appropriate person via the remote monitoring internet server.

14. The kitchen hood assembly of claim 8 further comprising an alarm system operatively connected to the supervision module, and wherein detection of a fault by any of the monitoring circuits in the supervision module causes actuation of visual or audible alerts.

* * * * *